(12) United States Patent
Jiang et al.

(10) Patent No.: US 9,327,995 B2
(45) Date of Patent: May 3, 2016

(54) METHOD FOR PREPARING BARIUM TITANATE

(75) Inventors: Zhiguang Jiang, Anshun (CN); Dong Hua, Chongqing (CN)

(73) Assignees: GUIZHOU REDSTAR DEVELOPING CO., LTD., Anshun, Guizhou Province (CN); BEIJING MAXQUEEN TECHNOLOGY CO., LTD., Beijing (CN)

( * ) Notice: Subject to any disclaimer, the term of this patent is extended or adjusted under 35 U.S.C. 154(b) by 1009 days.

(21) Appl. No.: 13/508,620

(22) PCT Filed: Jul. 20, 2010

(86) PCT No.: PCT/CN2010/075307
§ 371 (c)(1),
(2), (4) Date: Jun. 28, 2012

(87) PCT Pub. No.: WO2011/054221
PCT Pub. Date: May 12, 2011

(65) Prior Publication Data
US 2012/0258036 A1 Oct. 11, 2012

(30) Foreign Application Priority Data

Nov. 9, 2009 (CN) .......................... 2009 1 0212272

(51) Int. Cl.
C01F 11/02 (2006.01)
C01G 23/00 (2006.01)

(52) U.S. Cl.
CPC ........... *C01G 23/006* (2013.01); *C01P 2004/32* (2013.01); *C01P 2004/51* (2013.01); *C01P 2004/61* (2013.01); *C01P 2006/80* (2013.01)

(58) Field of Classification Search
CPC .... C01G 23/00; C01G 23/001; C01G 23/003; C01G 23/005; C01G 23/006; C01G 23/022; C01G 23/053; C01G 23/036; C01F 11/00; C01F 11/02; C01F 11/20; C01F 11/24; C01F 11/26; C01F 11/28; C01F 11/30; C01P 2004/32; C01P 2004/61; C01P 2004/51; C01P 2006/80

See application file for complete search history.

(56) References Cited

U.S. PATENT DOCUMENTS 4,337,234 A * 6/1982 Hentschel et al. ............. 423/424
5,783,165 A * 7/1998 Wilson et al. ................. 423/598
(Continued)

FOREIGN PATENT DOCUMENTS

CN WO03016219 * 2/2003 .................... 423/598

OTHER PUBLICATIONS

Guo, Jing et al., "Preparation of Ultra-fine Barium Titanate Powder by Coprecipitation Method Using TiCl4", Sichuan Nonferrous Metals, vol. 2, pp. 29-33, 2004.
(Continued)

*Primary Examiner* — Melvin C Mayes
*Assistant Examiner* — Smita Patel
(74) *Attorney, Agent, or Firm* — Nath, Goldberg & Meyer; Tanya E. Harkins

(57) ABSTRACT

Provided is a method for preparing barium titanate, which comprises: dissolving $BaCl_2 \cdot 2H_2O$ into $TiCl_4$ solution to prepare Ba—Ti mixed solution with a Ba/Ti mol ratio of 1:1; adding ammonia and ammonium bicarbonate into deionized water to prepare synthetic agent with a $NH_4OH/NH_4HCO_3$ mol ratio of 5:1; adding Ba—Ti mixed solution and synthesis agent into a reactor for synthesis to obtain a slurry; pressure filtering, thermal washing and then pressure filtering, to obtain a filter cake; calcining the filter cake for 1 hour at 590-610° C., followed by further calcining for 2 hours at 700-950° C.; crushing the obtained solid produced by a crusher, and thereby obtaining barium titanate. The obtained barium titanate is spherical, and has a narrower particle size distribution. The method reduces costs.

13 Claims, 1 Drawing Sheet

(56) References Cited

U.S. PATENT DOCUMENTS 7,179,441 B2 * 2/2007 Jung et al. .................. 423/593.1
8,715,614 B2 * 5/2014 Chen .......................... B01J 8/10
　　　　　　　　　　　　　　　　　　　　　423/594.16

OTHER PUBLICATIONS

Office action dated Dec. 14, 2010 for corresponding priority application CN 200910212272.7.

* cited by examiner

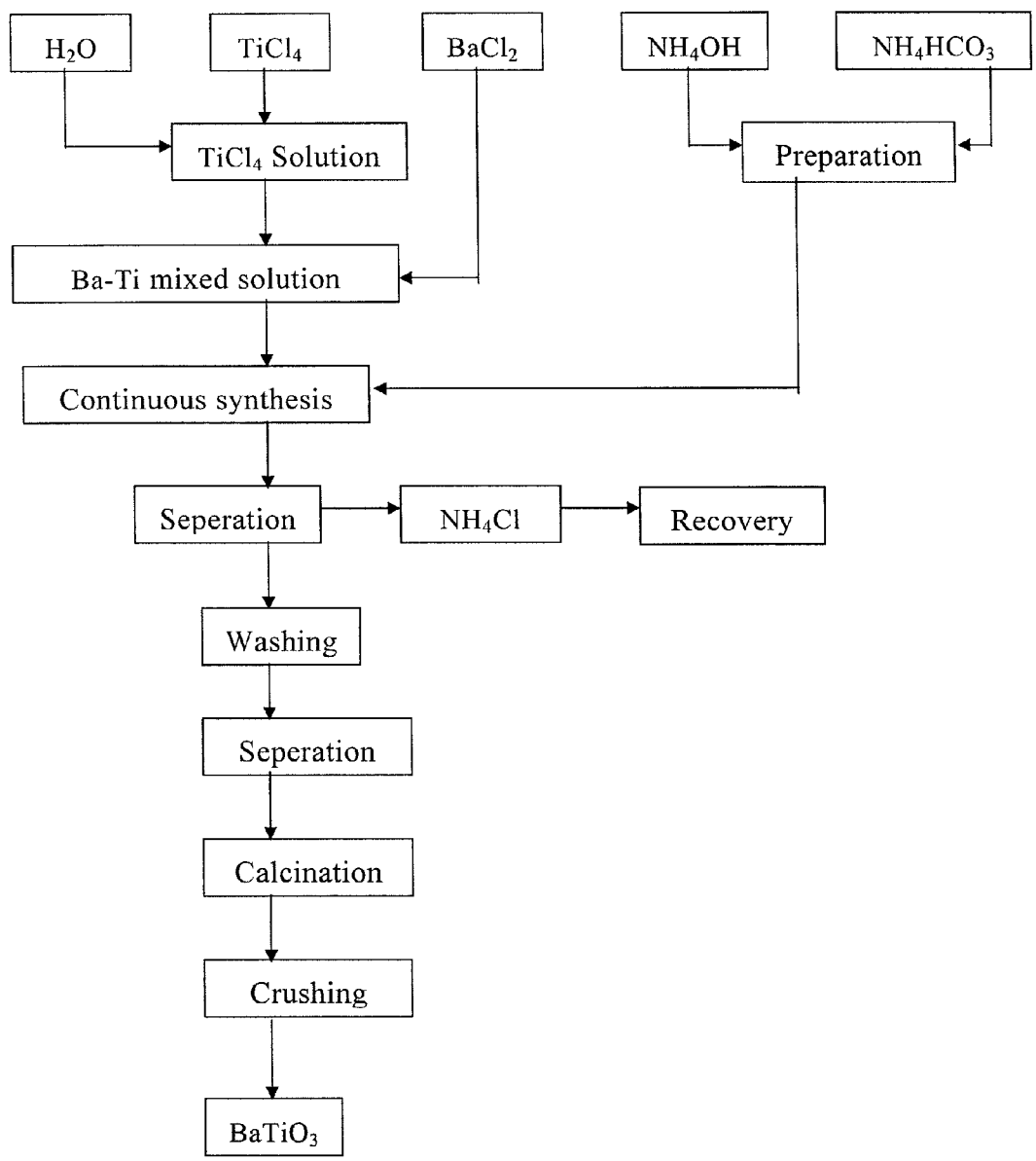

METHOD FOR PREPARING BARIUM TITANATE

FIELD OF THE INVENTION

The present invention relates to a method for preparing barium titanate.

BACKGROUND OF THE INVENTION

Barium titanate is widely used in the fields of electronic functional ceramics and auto power battery etc.

There are many methods to prepare barium titanate. The particles of barium titanate synthesized by the high temperature solid phase reaction are larger and its particle distribution are wider; it is relatively difficult to precisely control the molar ratio of barium to titanium in the oxalate coprecipitation method, moreover, there is serious agglomeration and hardening during calcination procedure; in addition, the production amount of single batch of the hydrothermal synthesis method is relatively small and the equipment investment of it is much larger; the property of barium titanate prepared by sol-gel method is excellent, but the preparation cost is extremely high.

BRIEF SUMMARY OF THE INVENTION

The present invention provides a method of preparing barium titanate, by which sub-micron barium titanate material with a narrow particle distribution is obtained by utilizing liquid-liquid synthesis. The problem of segregation of the molar ratio of barium to titanium during washing process is solved by the composite gel formed from $BaCO_3$ and $H_4TiO_4$, and the preparation cost was greatly reduced by utilizing inorganic gel formed from $H_4TiO_4$ in the process of low-temperature calcination synthesis.

Main chemical reactions involved in the present invention:

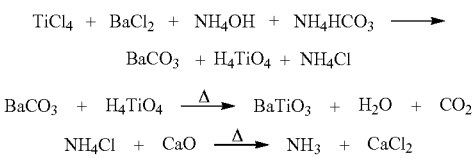

The method for preparing barium titanate provided in the present invention includes the following steps:

1) Preparation of Ba—Ti mixed solution: dissolving $BaCl_2 \cdot 2H_2O$ into $TiCl_4$ solution to prepare a solution with a Ba/Ti molar ratio of 1:1.
2) Preparation of the synthetic agent: adding ammonia and ammonium bicarbonate into deionized water to prepare a solution with $NH_4OH/NH_4HCO_3$ molar ratio of 5:1.
3) Preparation of Barium titanate: adding the Ba—Ti mixed solution and the synthetic agent into a reactor for synthesis reaction to obtain a slurry.
4) Separation: separating the slurry from step 3) by pressure filtration, preferably, reacting CaO with $NH_4Cl$ in the mother liquor obtained from pressure filtration process to recover $NH_4OH$, thermal washing the obtained solid, and then pressure filtering and obtaining a filter cake, discharging the obtained mother liquor after treatment.
5) Calcination: calcining the filter cake from step 4) for 1 hour at 590-610° C., and then calcining for 2 hours at 700-950° C.;
6) Crushing: crushing the solid from step 5) by a crusher to obtain barium titanate product.

Preferably, the $TiCl_4$ solution in step 1) is prepared by adding deionized water into the purchased industrial grade $TiCl_4$, in which $[Ti^{4+}]=0.5$-2.5 mol/L, more preferably $[Ti^{4+}]=1.0$-2.0 mol/L.

Preferably, in the Ba—Ti mixed solution of step 1), $[Ti^{4+}]=[Ba^{2+}]=0.1$-0.8 mol/L, more preferably, $[Ti^{4+}]=0.4$-0.6 mol/L.

Preferably, in said synthetic agent of step 2), $[CO_3^{2-}]=0.2$-2.5 mol/L, more preferably, $[CO_3^{2-}]=1.0$-1.5 mol/L.

Preferably, the flow rate of said Ba—Ti mixed solution in step 3) is 100-4000 L/h, more preferably 1000-2000 L/h; the flow rate of the synthetic agent is 100-4000 L/h, more preferably 500-1500 L/h; in which, the excess ratio of the synthetic agent (more than the theoretical volume percentage) could be 2-15%, more preferably 5-7%; the rotating speed of the synthesis reactor is 100-700 rpm, more preferably 300-500 rpm.

Preferably, the ratio of material to water in the thermal washing process of step 4) is 1:4-1:7, more preferably 1:6-1:7, the temperature of thermal washing is 90-95° C., the time for thermal washing is 2 hours.

Preferably, in the calcination operation of step 5), the temperature is increased from room temperature to 590-610° C. at the rate of 5° C./min and the filter cake is calcined for 1 hour, and then the temperature is increased to 700-950° C. at the rate of 3° C./min and the filter cake is calcined for 2 hours, and the filter cake is finally cooled down to room temperature.

In the present invention, the sub-micron barium titanate material obtained by liquid-liquid synthesis has a narrow particle distribution, the problem of segregation of the molar ratio of barium to titanium during washing process is solved by composite gel, and the preparation cost is greatly reduced by utilizing inorganic gel method in the process of low-temperature calcination synthesis, and the spherical barium titanate particle is obtained.

BRIEF DESCRIPTION OF THE DRAWINGS

FIG. 1 is the main flow chart of preparing barium titanate in the present invention.

EMBODIMENTS

The present invention is illustrated by the following detailed examples, but the protection scope of the present invention is not limited to the examples.

EXAMPLE 1

1) Preparation of Ba—Ti mixed solution: deionized water was added to purchased national level $TiCl_4$, to prepare $TiCl_4$ solution, in which $[Ti^{4+}]=0.5$ mol/L, and dissolving $BaCl_2 \cdot 2H_2O$ into the $TiCl_4$ solution, to prepare a solution with a Ba/Ti molar ratio of 1:1 and $[Ti^{4+}]=[Ba^{2+}]=0.10$ mol/L;

2) Preparation of synthetic agent: ammonia and ammonium bicarbonate were added into deionized water, to obtain a solution with $NH_4OH/NH_4HCO_3$ molar ratio of 5:1 and $[CO_3^{2-}]=1.0$ mol/L;

3) Preparation of barium titanate: the Ba—Ti mixed solution and the synthesis agent were added in a reactor for synthesis reaction; By controlling the flow rate of the Ba—Ti mixed solution as 1000 L/h, the flow rate of the synthesis agent as 100 L/h and the rotating rate of the reactor as 350 rpm, a slurry was obtained. 4) Separation: the said synthesized slurry was separated by utilizing a squeezing filter, CaO was used to react with mother liquor to recover $NH_4OH$, the obtained solid was heated to 90° C., and was thermal washed at the ratio of material to water of 1:7 for 2 hours, and then was filtration separated to obtain a filter cake, the mother liquor obtained from the filtration separation was discharged after treatment. 5) Calcination: the filter cake was heated from room temperature to 600° C. at the rate of 5° C./min and was calcined for 1 hour, then was heated to 780° C. at the rate of 3° C./min and was calcined for 2 hours, and was cooled down to room temperature. 6) Crushing: the calcined product was crushed by a crusher to obtain barium titanate sample 1#.

EXAMPLE 2

Except the selection of the following parameters and steps, $BaTiO_3$ sample 2# in this example was prepared according to the same steps in example 1.

1) $[Ti^{4+}]=1.0$ mol/L in $TiCl_4$ solution, $[Ba^{2+}]=0.47$ mol/L in Ba—Ti mixed solution.
2) $[CO_3^{2-}]=1.22$ mol/L in synthetic agent
3) Flow rate of Ba—Ti mixed solution was 1500 L/h; flow rate of synthetic agent was 607 L/h; rotating rate of the reactor was 500 rpm;
4) Ratio of material to water of the thermal washing for solid was 1:6, the washing temperature was 90° C., the time for washing was 2 hours.
5) In the calcination process, filter cake was heated from room temperature to 610° C. at the rate of 5° C./min and was calcined for 1 hour, and then was heated to 800° C. at the rate of 3° C./min and was calcined for 2 hours.

EXAMPLE 3

Except the selection of the following parameters and steps, $BaTiO_3$ sample 3# in this example was prepared according to the same steps in example 1.

1) $[Ti^{4+}]=2.5$ mol/L in $TiCl_4$ solution, $[Ba^{2+}]0.8$ mol/L in Ba—Ti mixed solution.
2) $[CO_3^{2-}]=1.5$ mol/L in synthetic agent;
3) Flow rate of Ba—Ti mixed solution was 2000 L/h; flow rate of synthetic agent was 1500 L/h; the rotating rate of the reactor was 300 rpm;
4) The ratio of material to water of the thermal washing for the solid was 1:4, the washing temperature was 95° C., the time for washing was 2 hours.
5) In the process of calcination, filter cake was heated from room temperature to 590° C. at the rate of 5° C./min and was calcined for 1 hour, and then was heated to 950° C. at the rate of 3° C./min and was calcined for 2 hours, and was finally cooled down to room temperature.

EXAMPLE 4

Except the selection of the following parameters and steps, $BaTiO_3$ sample 4# in this example was prepared according to the same steps in example 1.

1) $[Ti^{4+}]=1.5$ mol/L in $TiCl_4$ solution, $[Ba^{2+}]=0.4$ mol/L in Ba—Ti mixed solution.
2) $[CO_3^{2-}]=2.5$ mol/L in synthetic agent; 3) Flow rate of Ba—Ti mixed solution was 4000 L/h; flow rate of synthetic agent was 4000 L/h; the rotating rate of the reactor was 700 rpm;
4) The ratio of material to water of the thermal washing for the solid was 1:6, the washing temperature was 95° C., the time for washing was 2 hours;
5) In the process of calcination, filter cake was heated from room temperature to 600° C. at the rate of 5° C./min and was calcined for 1 hour, and then was heated to 700° C. at the rate of 3° C./min and was calcined for 2 hours, and was finally cooled down to room temperature.

EXAMPLE 5

Except the selection of the following parameters and steps, $BaTiO_3$ sample 5# in this example was prepared according to the same steps in example 1.

1) $[Ti^{4+}]=1.8$ mol/L in $TiCl_4$ solution, $[Ba^{2+}]=0.6$ mol/L in Ba—Ti mixed solution.
2) $[CO_3^{2-}]=0.2$ mol/L in synthetic agent;
3) Flow rate of Ba—Ti mixed solution was 100 L/h; flow rate of synthetic agent was 500 L/h; the rotating rate of the reactor was 100 rpm;
4) The ratio of material to water of the thermal washing for the solid was 1:6, the washing temperature was 95° C., the time for washing was 2 hours.
5) In the process of calcination, filter cake was heated from room temperature to 600° C. at the rate of 5° C./min and was calcined for 1 h, and then was heated to 700° C. at the rate of 3° C./min and was calcined for 2 hours, and was finally cooled down to room temperature.

EXAMPLE 6

Except the selection of the following parameters and steps, $BaTiO_3$ sample 6# in this example was prepared according to the same steps in example 1.

1) $[Ti^{4+}]=1.5$ mol/L in $TiCl_4$ solution, $[Ba^{2+}]=0.5$ mol/L in Ba—Ti mixed solution.
2) $[CO_3^{2-}]=1.5$ mol/L in synthetic agent;
3) Flow rate of Ba—Ti mixed solution was 1500 L/h; flow rate of synthetic agent was 525 L/h; rotating rate of the reactor was 400 rpm;
4) The ratio of material to water of thermal washing for the solid was 1:6, the washing temperature was 90° C., the time for washing was 2 hours.
5) In the process of calcination, filter cake was heated from room temperature to 600° C. at the rate of 5° C./min and was calcined for 1 hour, and then was heated to 800° C. at the rate of 3° C./min and was calcined for 2 hours, and was finally cooled down to room temperature.

The testing results of respective component of the samples from all the examples were shown in the table below:

|  | 1# | 2# | 3# | 4# | 5# | 6# |
| --- | --- | --- | --- | --- | --- | --- |
| Ratio of Ba/Ti | 0.995 | 0.997 | 1.002 | 0.998 | 0.998 | 0.999 |
| $BaTiO_3$ (mass percentage) | 99.54 | 99.70 | 99.81 | 99.62 | 99.74 | 99.57 |
| Fe ppm | <10 | <10 | <10 | <10 | <10 | <10 |
| K ppm | <10 | <10 | <10 | <10 | <10 | <10 |
| Na ppm | <10 | <10 | <10 | <10 | <10 | <10 |

-continued

|  | 1# | 2# | 3# | 4# | 5# | 6# |
|---|---|---|---|---|---|---|
| Ca ppm | <100 | <100 | <100 | <10 | <10 | <10 |
| Mg ppm | <10 | <10 | <10 | <10 | <10 | <10 |
| $H_2O$ % (mass percentage) | <0.1 | <0.1 | <0.1 | <0.1 | <0.1 | <0.1 |
| D50 μm (the median diameter of powder particle distribution) | 0.44 | 0.51 | 0.87 | 0.47 | 0.54 | 0.42 |
| Shape | subsphaeroidal | subsphaeroidal | subsphaeroidal | subsphaeroidal | subsphaeroidal | subsphaeroidal |

The invention claimed is:

1. A method for preparing barium titanate product, comprising:
   1) preparing a Ba—Ti mixed solution by: dissolving $BaCl_2 \cdot 2H_2O$ into a $TiCl_4$ solution and preparing the Ba—Ti mixed solution, the mixed solution having a Ba/Ti molar ratio of 1:1;
   2) preparing a synthetic agent by: adding ammonia and ammonium bicarbonate into deionized water and preparing the synthetic agent in solution, the synthetic agent having a $NH_4OH/NH_4HCO_3$ molar ratio of 5:1;
   3) preparing barium titanate by: adding the Ba—Ti mixed solution, the mixed solution having a flow rate of 100-4000 L/h, and the synthetic agent, the synthetic agent having a flow rate of 100-4000 L/h, into a reactor for synthesis reaction thereby obtaining a slurry;
   4) separation: separating the slurry from step 3) by pressure filtration, thermal washing the obtained solid, then pressure filtering and obtaining a filter cake;
   5) calcination: calcining the filter cake from step 4) for 1 hour at 590-610° C., and then calcining for an additional 2 hours at 700-950° C.; and
   6) crushing: crushing the solid from step 5) by using a crusher to obtain the barium titanate product.

2. The method for preparing barium titanate according to claim 1, wherein the $TiCl_4$ solution is $[Ti^{4+}]$=0.5-2.5 mol/L.

3. The method for preparing barium titanate according to claim 1, wherein the $TiCl_4$ solution is $[Ti^{4+}]$=1.0-2.0 mol/L.

4. The method for preparing barium titanate according to claim 1, wherein the Ba—Ti mixed solution is $[Ti^{4+}]$=$[Ba^{2+}]$=0.1-0.8 mol/L.

5. The method for preparing barium titanate according to claim 1, wherein the Ba—Ti mixed solution is $[Ti^{4+}]$=$[Ba^{2+}]$=0.4-0.6 mol/L.

6. The method for preparing barium titanate according to claim 1, wherein the synthetic agent is $[CO_3^{2-}]$=0.2-2.5 mol/L.

7. The method for preparing barium titanate according to claim 1, wherein the synthetic agent is $[CO_3^{2-}]$=1.0-1.5 mol/L.

8. The method for preparing barium titanate according to claim 1, wherein the synthesis reactor has a rotating speed of 100-700 rpm.

9. The method for preparing barium titanate according to claim 1, wherein the flow rate of the Ba—Ti mixed solution is 1000-2000 L/h, and the flow rate of synthetic agent is 500-1500 L/h.

10. The method for preparing barium titanate according to claim 1, wherein the separation step further comprises reacting CaO with mother liquor obtained from the first pressure filtration process to recover $NH_4OH$.

11. The method for preparing barium titanate according to claim 1, wherein the temperature of the thermal washing is 90-95° C., and the time for washing is 2 hours.

12. The method for preparing barium titanate according to claim 1, wherein the temperature of calcining is increased from room temperature to 590-610° C. at the rate of 5° C./min, the filter cake is subsequently calcined for 1 hour, next the temperature is increased to 700-950° C. at the rate of 3° C./min, the filter cake is additionally calcined for 2 hours, and the filter cake is then cooled to room temperature.

13. The method for preparing barium titanate according to claim 8, wherein the rotating speed of synthesis reactor is 300-500 rpm.

* * * * *